(12) United States Patent
Scapens et al.

(10) Patent No.: US 11,980,869 B2
(45) Date of Patent: May 14, 2024

(54) ZIRCONIA-BASED AQUEOUS NP-DISPERSION FOR USE IN COATING FILTER SUBSTRATES

(71) Applicant: MAGNESIUM ELEKTRON LIMITED, Manchester (GB)

(72) Inventors: David Alastair Scapens, Manchester (GB); Deborah Jayne Harris, Manchester (GB)

(73) Assignee: Magnesium Elektron Limited, Manchester (GB)

( * ) Notice: Subject to any disclaimer, the term of this patent is extended or adjusted under 35 U.S.C. 154(b) by 405 days.

(21) Appl. No.: 17/423,979

(22) PCT Filed: Dec. 2, 2019

(86) PCT No.: PCT/GB2019/053405
§ 371 (c)(1),
(2) Date: Jul. 19, 2021

(87) PCT Pub. No.: WO2020/161459
PCT Pub. Date: Aug. 13, 2020

(65) Prior Publication Data
US 2022/0080393 A1   Mar. 17, 2022

(30) Foreign Application Priority Data
Feb. 5, 2019 (GB) .................................. 1901560

(51) Int. Cl.
*B01J 21/04* (2006.01)
*B01D 53/86* (2006.01)
(Continued)

(52) U.S. Cl.
CPC .............. *B01J 23/10* (2013.01); *B01D 53/86* (2013.01); *B01J 21/066* (2013.01);
(Continued)

(58) Field of Classification Search
CPC . B01J 21/04; B01J 21/066; B01J 23/10; B01J 35/0013; B01J 35/0046;
(Continued)

(56) References Cited

U.S. PATENT DOCUMENTS 4,714,694 A * 12/1987 Wan .................. B01J 23/63
502/355
5,427,601 A * 6/1995 Harada ............... B01D 53/945
422/174
(Continued)

FOREIGN PATENT DOCUMENTS

| CN | 104591275 A | 5/2015 |
| CN | 105008025 A | 10/2015 |

(Continued)

OTHER PUBLICATIONS

International Search Report and Written Opinion on PCT/GB2019/053405 dated Feb. 21, 2020 (14 pages).
(Continued)

*Primary Examiner* — Cam N. Nguyen
(74) *Attorney, Agent, or Firm* — Praedcere Law (57) ABSTRACT

This invention relates to an aqueous dispersion of particles, the dispersion having a particle content of 10-70 wt %, and the particles comprising, on an oxide basis: (a) 10-98 wt % in total of $ZrO_2+HfO_2$, and (b) 2-90 wt % in total of $Al_2O_3$, $CeO_2$, $La_2O_3$, $Nd_2O_3$, $Pr_6O_{11}$, $Y_2O_3$, or a transition metal oxide, wherein the dispersion has a Z-average particle size of 100-350 nm and the particles have a crystallite size of 1-9 nm. The invention also relates to a substrate coated with the aqueous dispersion of particles.

20 Claims, 5 Drawing Sheets

(51) Int. Cl.
  *B01J 21/06* (2006.01)
  *B01J 23/10* (2006.01)
  *B01J 23/889* (2006.01)
  *B01J 35/00* (2006.01)
  *B01J 35/02* (2006.01)
  *B01J 35/10* (2006.01)
  *B01J 35/23* (2024.01)
  *B01J 35/30* (2024.01)
  *B01J 35/50* (2024.01)
  *B01J 35/63* (2024.01)
  *B01J 35/64* (2024.01)
  *B01J 37/02* (2006.01)
  *B01J 37/08* (2006.01)

(52) U.S. Cl.
  CPC ............ *B01J 23/8892* (2013.01); *B01J 35/23* (2024.01); *B01J 35/391* (2024.01); *B01J 35/50* (2024.01); *B01J 35/633* (2024.01); *B01J 35/651* (2024.01); *B01J 35/653* (2024.01); *B01J 35/657* (2024.01); *B01J 37/0215* (2013.01); *B01J 37/08* (2013.01); *B01D 2255/2061* (2013.01); *B01D 2255/2063* (2013.01); *B01D 2255/2065* (2013.01); *B01D 2255/2066* (2013.01); *B01D 2255/2068* (2013.01); *B01D 2255/20715* (2013.01); *B01D 2255/2092* (2013.01); *B01D 2255/908* (2013.01); *B01D 2255/9155* (2013.01); *B01D 2255/9202* (2013.01); *B01D 2255/9205* (2013.01)

(58) Field of Classification Search
  CPC .. B01J 35/026; B01J 35/1038; B01J 35/1066; B01J 35/1071; B01J 35/1076; B01D 53/86
  USPC .......... 502/302–304, 349, 355, 415
  See application file for complete search history.

(56) References Cited

U.S. PATENT DOCUMENTS

| | | | | |
|---|---|---|---|---|
| 5,571,492 | A * | 11/1996 | Yao | C04B 35/50 423/579 |
| 5,582,785 | A * | 12/1996 | Yao | B01J 37/03 264/118 |
| 5,898,014 | A * | 4/1999 | Wu | C01G 25/006 502/332 |
| 5,945,370 | A * | 8/1999 | Yokoi | C01G 25/006 502/302 |
| 5,948,723 | A * | 9/1999 | Sung | B01J 37/038 502/340 |
| 6,150,299 | A * | 11/2000 | Umemoto | B01J 27/053 423/247 |
| 6,171,572 | B1 * | 1/2001 | Aozasa | C01G 25/00 423/594.12 |
| 6,248,688 | B1 * | 6/2001 | Wu | B01D 53/945 502/336 |
| 6,492,297 | B1 * | 12/2002 | Sung | B01D 53/945 502/302 |
| 7,037,875 | B2 * | 5/2006 | Hu | B01D 53/945 502/328 |
| 7,041,263 | B2 * | 5/2006 | Sung | B01D 53/945 423/247 |
| 7,166,263 | B2 * | 1/2007 | Vanderspurt | C01F 17/241 502/302 |
| 7,612,011 | B2 * | 11/2009 | Vanderspurt | C01G 27/006 502/302 |
| 7,871,957 | B2 * | 1/2011 | Willigan | C01B 3/16 423/247 |
| 8,226,740 | B2 * | 7/2012 | Chaumonnot | B01J 29/89 502/64 |
| 8,455,390 | B2 | 6/2013 | Kikuchi et al. | |
| 10,247,071 | B2 * | 4/2019 | Wang | B01J 37/0215 |
| 10,883,402 | B2 * | 1/2021 | Wang | B01J 37/0201 |
| 2006/0052241 | A1 * | 3/2006 | Airiau | C01B 37/02 428/402 |
| 2006/0233691 | A1 * | 10/2006 | Vanderspurt | C01G 25/006 48/128 |
| 2009/0105354 | A1 | 4/2009 | Oswald et al. | |
| 2009/0120010 | A1 | 5/2009 | Nonnet et al. | |
| 2013/0336864 | A1 * | 12/2013 | Zheng | B01J 23/63 502/415 |
| 2018/0297014 | A1 | 10/2018 | Mohanan et al. | |

FOREIGN PATENT DOCUMENTS

| | | |
|---|---|---|
| EP | 0 709 351 A1 | 5/1996 |
| JP | 2006-095513 A | 4/2006 |
| WO | WO 2014125296 A1 | 8/2014 |

OTHER PUBLICATIONS

Search and Examination Report on GB 1901560.1 dated Apr. 4, 2019 (4 pages).

* cited by examiner

ZIRCONIA-BASED AQUEOUS NP-DISPERSION FOR USE IN COATING FILTER SUBSTRATES

CROSS-REFERENCE TO RELATED APPLICATIONS

This is a U.S. national stage application of international application No. PCT/GB2019/053405, filed Dec. 2, 2019, which claims foreign priority of GB application Ser No. 1901560.1, filed on Feb. 5, 2019.

This invention relates to aqueous dispersions of particles comprising zirconia, hafnia and one or more other rare earth elements, e.g. ceria, for use in the coating of particulate filters.

BACKGROUND

Washcoating of filter substrates (which may include silicon carbide, cordierite, aluminium titanate etc) is generally carried out by one of three methods; 1) dip-coating, 2) vacuum suction through the filter, 3) pressurising the washcoat.

Dip-coating (e.g. as described in US20130216439A1) involves immersing the substrate in a washcoat bath and allowing the washcoat to permeate/diffuse into the porous walls. Excess washcoat is typically removed using compressed air.

In the vacuum suction method, the washcoat is initially applied to the substrate in some way (such as dip-coating, or pouring) and then a vacuum is applied to pull the washcoat thorough the filter (e.g. as shown in U.S. Pat. No. 8,815,189 and WO1999047260A1).

Pressurising the washcoat is essentially the opposite of vacuum suction, whereby positive pressure is used to force the washcoat into the substrate (rather than negative pressure pulling it through), and may also be used in combination with vacuum suction (this is referred to in WO1999047260A1).

The concept of coating gasoline particulate filters with low particle size materials to give improved back-pressure characteristics is discussed in US20090129995A1. However, the washcoat loading used in the examples (26 g/L) is relatively low, therefore in many applications this limits the filtration efficiency and/or catalytic performance. The referenced particle size in this document is $d_{90}$<5 µm.

GB2514875B states that a reduction in back-pressure can be achieved by using a ceria-zirconia oxide with $d_{50}$<1 µm, although this still only has a moderate washcoat loading (97.6 g/L). However, this still refers to relatively large particle size oxide materials. A similar disclosure is found in US20180297014A1, where although a dispersion is stated as having <1 µm particles these particles would still be relatively large.

U.S. Pat. No. 9,340,738 (and FR2885308B1 referenced therein) describes the formation of ceria-zirconia nanoparticles, with a range of nm-sized hydrodynamic diameters (as measured by DLS). However, an essential element of their synthesis is the addition of an organic agent (alkoxycarboxylic acid) which is not preferred from a health and safety/environmental perspective.

US20170312313A1 also describes the formation of ceria-zirconia nanoparticles, and again relates exclusively to the use of organic agents (in this case long chain surfactant molecules). The synthesis also uses organic solvent and is not ideally suited to industrial scale manufacture. The particle size of the nanoparticles, as measured by DLS, is described as being "very small".

CN104492418B again describes the synthesis of ceria-zirconia nano particles, this time using a hydrothermal/solvothermal method. However, a key part of the preparation is again the addition of organic agents (e.g. alcohols, carboxylic acids), and the product itself is composed of monodisperse particles (2-8 nm) as measured by TEM.

JP4582789B describes another hydrothermal process for preparing ceria-zirconia nanoparticles, and again there is a measurable X-ray diffraction (XRD) pattern upon drying the material. The maximum achievable concentration is limited to 10%, and even then this involves an ultrafiltration step which is not suitable for industrial scale preparation.

US20090105354A1 relates to the formation of a dispersion by pre-dispersing an oxide powder using a surface-modifying agent. However, the particle surface areas are only 60±15 $m^2/g$, the preferred average primary particle size (i.e. equivalent to crystallite size) is 12-14 nm, and the loss on ignition is no more than 3.0 wt %. These latter two properties result from the oxidic nature of the particles.

Thus, there is a need to create a novel class of materials which, when coated on to a filter substrate, enable suitable catalytic performance and filtration efficiency but with improved back-pressure characteristics over standard materials.

STATEMENT OF INVENTION

This invention relates to an aqueous dispersion of particles, the dispersion having a particle content of 10-70 wt %, and the particles comprising, on an oxide basis:
(a) 10-98 wt % in total of $ZrO_2$+$HfO_2$, and
(b) 2-90 wt % in total of $Al_2O_3$, $CeO_2$, $La_2O_3$, $Nd_2O_3$, $Pr_6O_{11}$, $Y_2O_3$, or a transition metal oxide,
wherein the dispersion has a Z-average particle size of 100-350 nm and the particles have a crystallite size of 1-9 nm. The particle content can also be referred to as the dispersion comprising 10-70 wt % solids.

More particularly, the particles may comprise, on an oxide basis:
(a) 10-98 wt % in total of $ZrO_2$+$HfO_2$,
(b) 2-90 wt % $CeO_2$,
(c) 0-30 wt % in total of $La_2O_3$, $Nd_2O_3$, $Pr_6O_{11}$, $Y_2O_3$, or a transition metal oxide, and
(d) 0-88 wt % $Al_2O_3$.

Generally, a dispersion is a system in which particles are dispersed in a continuous phase of a different composition. The term "dispersion" is used in relation to the invention to refer to a system in which the particles are dispersed in a liquid phase or medium (in this case, water). The particles in the dispersions of the invention may have a predominantly oxide character, but with some hydrous nature. Although stable in their own right, dispersions may optionally comprise additives, such as surfactants, organic polymers or ions, in order to increase the stability of the dispersion. Such additives are known to those skilled in the art.

In relation to the invention, the term "transition metal" is used to refer to the first row transition metals (i.e. Sc, Ti, V, Cr, Mn, Fe, Co, Ni, Cu and Zn), Nb, W and Ag.

In the context of the invention, in some embodiments the total of (a)+(b), optionally+(c)+(d), and any incidental impurities may equal 100 wt %.

In particular, the particles may comprise, on an oxide basis, 20-90 wt % in total of $ZrO_2$ and $HfO_2$, more particularly 25-80 wt %. In particular, the particles may comprise, on an oxide basis, 10-80 wt % $CeO_2$, more particularly 15-75 wt %.

In some embodiments, the particles may comprise, on an oxide basis, 1-25 wt % in total of $La_2O_3$, $Nd_2O_3$, $Pr_6O_{11}$, $Y_2O_3$, and transition metal oxides. In relation to each of these components individually, alone or in addition to being within the range for the total amount, the particles may comprise, on an oxide basis, 0-20 wt % $La_2O_3$, and in some embodiments 1-15 wt %. In particular, the particles may comprise, on an oxide basis, 0-20 wt % $Nd_2O_3$, and in some embodiments 1-10 wt %. More particularly, the particles may comprise, on an oxide basis, 0-25 wt % $Pr_6O_{11}$, and in some embodiments 1-20 wt %. In particular, the particles may comprise, on an oxide basis, 0-20 wt % $Y_2O_3$, and in some embodiments 1-6 wt %. In other embodiments, when the particles comprise $Y_2O_3$, they also comprise, on an oxide basis, at least 0.1 wt % of at least one of $Al_2O_3$, $CeO_2$, $La_2O_3$, $Nd_2O_3$, $Pr_6O_{11}$, or a transition metal oxide More particularly, the particles may comprise, on an oxide basis, 0-10 wt % of a transition metal oxide, and in some embodiments 1-5 wt %.

More particularly, the dispersion may have a particle content of 5-50 wt %, more particularly 10-45 wt %, even more particularly 15-40 wt %.

The dispersion may additionally comprise alumina particles, for example particles comprising, on an oxide basis, at least 50 wt % $Al_2O_3$. In particular, the alumina particles may comprise, on an oxide basis, (a) 90-100 wt % $Al_2O_3$, (b) 0-10 wt % $SiO_2$, (c) 0-10 wt % rare earth oxide including yttria and (d) 0-10 wt % $ZrO_2$.+$HfO_2$. In other embodiments, the dispersion may comprise 0.1 wt % or less $Al_2O_3$ (i.e. 0-0.1 wt %).

In particular, the dispersion may have a polydispersity index of 0.10-0.35, more particularly 0.15-0.30, even more particularly 0.18-0.27. More particularly, the polydispersity index (PDI) may be measured by dynamic light scattering (DLS).

More particularly, the dispersion may have a Z-average particle size of 100-325 nm, even more particularly 100-310 nm, more particularly 100-300 nm, even more particularly 110-290 nm. In particular, the Z-average particle size may be measured by dynamic light scattering (DLS).

More particularly, the dispersion may have a particle size distribution as measured by volume having a d10 value in the range 0.1-0.7 µm, even more particularly in the range 0.2-0.6 µm, more particularly 0.3-0.5 µm.

In particular, the dispersion may have a particle size distribution as measured by volume having a d50 value in the range 0.1-0.9 µm, more particularly in the range 0.2-0.8 µm, even more particularly in the range 0.3-0.7 µm.

More particularly, the dispersion may have a particle size distribution as measured by volume having a d90 value in the range 0.1-1.2 µm, even more particularly in the range 0.2-1.0 µm, more particularly 0.3-0.9 µm.

In particular, the d10, d50 and d90 may be measured by laser diffraction.

In particular, the dispersion may have a pH of 3-9, more particularly 4-8.5, even more particularly 4.5-8. More particularly, the dispersion may have a dynamic viscosity of 1-1000 cPs, even more particularly 5-200 cPs. In particular, viscosity may be measured at 500 $s^{-1}$, 22° C.+/−5° C. by dynamic viscosity analysis. In some embodiments, the dispersion may comprise a viscosity modifier. More particularly, the viscosity modifier may be a cellulose derivative, for example hydroxyethyl cellulose.

In particular, the particles in the dispersion may have a measurable crystallite size. More particularly, crystallite size may be measured by XRD and using the Scherrer equation. In particular, the crystallite size may be 2-9 nm, more particularly 3-8 nm.

More particularly, the particles may have a loss on ignition (LOI) of 1-20 wt %, even more particularly 5-15 wt %. In particular, LOI may be measured gravimetrically by drying the particles followed by calcination at 1000° C. In the context of the invention, a lower LOI value is understood to be associated with a higher degree of crystallinity (and thus a purely oxide or sintered material). In contrast, a higher LOI value is generally associated with hydroxide materials. The intermediate LOI values obtainable via the present invention are indicative of an oxide-type material with a partial "hydrous nature". In particular, the particles may have a surface area of at least 80 $m^2/g$, more particularly at least 100 $m^2/g$, even more particularly at least 120 $m^2/g$. In particular, the particles may have a surface area of less than 400 $m^2/g$, more particularly less than 350 $m^2/g$, even more particularly less than 300 $m^2/g$. More particularly, surface area may be measured by BET multipoint determination. In particular, the particles may have a total pore volume of at least 0.05 $cm^3/g$, more particularly at least 0.10 $cm^3/g$, even more particularly at least 0.12 $cm^3/g$. In particular, the particles may have a total pore volume of less than 0.60 $cm^3/g$, more particularly less than 0.50 $cm^3/g$, even more particularly less than 0.45 $cm^3/g$.

When the dispersion comprises 0.1 wt % or less $Al_2O_3$, the particles may have a total pore volume of less than 0.40 $cm^3/g$, more particularly less than 0.38 $cm^3/g$, even more particularly less than 0.35 $cm^3/g$.

More particularly, the dispersion may comprise less than 0.1 wt % $SO_3$ (i.e. the analytical technique used converts sulphate in the dispersion to $SO_3$, and this is the value quoted), even more particularly less than 0.05 wt %, more particularly less than 0.02 wt %. In particular, the dispersion may comprise less than 500 ppm Na, more particularly less than 250 ppm, even more particularly less than 100 ppm. More particularly, the dispersion may comprise less than 500 ppm Cl, more particularly less than 150 ppm, even more particularly less than 100 ppm. In particular, the dispersion may comprise less than 2000 ppm carbon. More particularly, this carbon content may exclude any contribution from one or more viscosity modifier(s).

In particular, the particles may, after drying and calcination at 550° C. for 2 hours, have a surface area of at least 50 $m^2/g$, more particularly at least 60 $m^2/g$, even more particularly at least 65 $m^2/g$. More particularly, the particles may, after drying and calcination at 550° C. for 2 hours, have a surface area of less than 300 $m^2/g$, even more particularly less than 260 $m^2/g$, more particularly less than 220 $m^2/g$. When the dispersion comprises 0.1 wt % or less $Al_2O_3$, the particles may, after drying and calcination at 550° C. for 2 hours, have a surface area of less than 200 $m^2/g$, even more particularly less than 150 $m^2/g$, more particularly less than 130 $m^2/g$.

In particular, the particles may, after drying and calcination at 1000° C. for 4 hours, have a surface area of at least 5 $m^2/g$, more particularly at least 10 $m^2/g$, even more particularly at least 13 $m^2/g$. More particularly, the particles may, after drying and calcination at 1000° C. for 4 hours, have a surface area of less than 250 $m^2/g$, even more particularly less than 200 $m^2/g$, more particularly less than 150 $m^2/g$. When the dispersion comprises 0.1 wt % or less $Al_2O_3$, the particles may, after drying and calcination at 1000° C. for 4 hours, have a surface area of less than 100 m$^2$/g, even more particularly less than 75 m$^2$/g, more particularly less than 50 m$^2$/g, even more particularly less than 40 m$^2$/g.

In particular, the particles may, after drying and calcination at 1100° C. for 12 hours in an atmosphere of 10% H$_2$O in air, have a surface area of at least 1 m$^2$/g, more particularly at least 2 m$^2$/g, even more particularly at least 3 m$^2$/g. More particularly, the particles may, after drying and calcination at 1100° C. for 12 hours in an atmosphere of 10% H$_2$O in air, have a surface area of less than 140 m$^2$/g, even more particularly less than 115 m$^2$/g, more particularly less than 80 m$^2$/g. When the dispersion comprises 0.1 wt % or less Al$_2$O$_3$, the particles may, after drying and calcination at 1100° C. for 12 hours in an atmosphere of 10% H$_2$O in air, have a surface area of less than 60 m$^2$/g, even more particularly less than 40 m$^2$/g, more particularly less than 20 m$^2$/g, even more particularly less than 15 m$^2$/g.

In particular, the particles may, after drying and calcination at 550° C. for 2 hours, have a total pore volume of at least 0.05 cm$^3$/g, more particularly at least 0.10 cm$^3$/g, even more particularly at least 0.12 cm$^3$/g. More particularly, the particles may, after drying and calcination at 550° C. for 2 hours, have a total pore volume of less than 0.80 cm$^3$/g, even more particularly less than 0.70 cm$^3$/g, more particularly less than 0.60 cm$^3$/g. In particular, total pore volume may be measured by N$_2$ porosimetry. When the dispersion comprises 0.1 wt % or less Al$_2$O$_3$, the particles may, after drying and calcination at 550° C. for 2 hours, have a total pore volume of less than 0.50 cm$^3$/g, even more particularly less than 0.40 cm$^3$/g, more particularly less than 0.30 cm$^3$/g.

In particular, the particles may, after drying and calcination at 1000° C. for 4 hours, have a total pore volume of at least 0.01 cm$^3$/g, more particularly at least 0.03 cm$^3$/g, even more particularly at least 0.05 cm$^3$/g. More particularly, the particles may, after drying and calcination at 1000° C. for 4 hours, have a total pore volume of less than 0.80 cm$^3$/g, even more particularly less than 0.60 cm$^3$/g, more particularly less than 0.45 cm$^3$/g. When the dispersion comprises 0.1 wt % or less Al$_2$O$_3$, the particles may, after drying and calcination at 1000° C. for 4 hours, have a total pore volume of less than 0.40 cm$^3$/g, even more particularly less than 0.30 cm$^3$/g, more particularly less than 0.20 cm$^3$/g, even more particularly less than 0.18 cm$^3$/g.

In particular, the particles may, after drying and calcination at 1100° C. for 12 hours in an atmosphere of 10% H$_2$O in air, have a total pore volume of at least 0.01 cm$^3$/g, more particularly at least 0.02 cm$^3$/g, even more particularly at least 0.03 cm$^3$/g. More particularly, the particles may, after drying and calcination at 1100° C. for 12 hours in an atmosphere of 10% H$_2$O in air, have a total pore volume of less than 0.70 cm$^3$/g, even more particularly less than 0.60 cm$^3$/g, more particularly less than 0.50 cm$^3$/g. When the dispersion comprises 0.1 wt % or less Al$_2$O$_3$, the particles may, after drying and calcination at 1100° C. for 12 hours in an atmosphere of 10% H$_2$O in air, have a total pore volume of less than 0.35 cm$^3$/g, even more particularly less than 0.20 cm$^3$/g, more particularly less than 0.15 cm$^3$/g even more particularly less than 0.12 cm$^3$/g.

In particular, the particles may, after drying and calcination at 550° C. for 2 hours, have a crystallite size of at least 2 nm, more particularly at least 3 nm, even more particularly at least 4 nm. More particularly, the particles may, after drying and calcination at 550° C. for 2 hours, have a crystallite size of less than 12 nm, even more particularly less than 10 nm, more particularly less than 9 nm. More particularly, crystallite size may be measured by XRD and using the Scherrer equation.

In particular, the particles may, after drying and calcination at 1000° C. for 4 hours, have a crystallite size of at least 5 nm, more particularly at least 8 nm, even more particularly at least 10 nm. More particularly, the particles may, after drying and calcination at 1000° C. for 4 hours, have a crystallite size of less than 25 nm, even more particularly less than 23 nm, more particularly less than 22 nm.

In particular, the particles may, after drying and calcination at 1100° C. for 12 hours in an atmosphere of 10% H$_2$O in air, have a crystallite size of at least 15 nm, more particularly at least 17 nm, even more particularly at least 18 nm. More particularly, the particles may, after drying and calcination at 1100° C. for 12 hours in an atmosphere of 10% H$_2$O in air, have a crystallite size of less than 35 nm, even more particularly less than 32 nm, more particularly less than 30 nm.

In particular, the particles may, after drying and calcination at 1000° C. for 4 hours, have a $T_{max}$ of at least 500° C., more particularly at least 550° C., even more particularly at least 570° C. More particularly, the particles may, after drying and calcination at 1000° C. for 4 hours, have a $T_{max}$ of less than 700° C., even more particularly less than 650° C., more particularly less than 625° C. In the context of the invention, $T_{max}$ is used to refer to the temperature of maximum H$_2$-reduction rate. In particular, $T_{max}$ may be measured by H$_2$-TPR.

In particular, the particles may, after drying and calcination at 1000° C. for 4 hours, have a CeO$_2$ reduction efficiency of at least 50%, more particularly at least 60%, even more particularly at least 65%. More particularly, CeO$_2$ reduction efficiency may be measured by H$_2$-TPR.

In particular, the particles may, after drying and calcination at 1000° C. for 4 hours, have an OSC of at least 400 µmolO$_2$/gCeO$_2$, more particularly at least 500 µmolO$_2$/gCeO$_2$, even more particularly at least 550 µmolO$_2$/gCeO$_2$. More particularly, the particles may, after drying and calcination at 1000° C. for 4 hours, have an OSC of less than 1200 µmolO$_2$/gCeO$_2$, more particularly less than 1100 µmolO$_2$/gCeO$_2$, even more particularly less than 1000 µmolO$_2$/gCeO$_2$. More particularly, oxygen storage capacity (OSC) may be measured by O$_2$-pulse at 200° C.

In a further embodiment, this invention relates to a substrate coated with a dispersion as defined above or the particles as described above. In particular, the substrate may comprise a ceramic or a metal, more particularly a ceramic. More particularly, the ceramic may be silicon carbide, cordierite, or aluminium titanate. More particularly, the substrate may be in the form of a filter. In particular, the substrate may comprise at least 100 g of the particles per Litre volume of substrate.

In particular, the filter coated with the dispersion as defined above may have pore volume in the range 2-0.1 µm of 0.065 ml/g or less, more particularly 0.060 ml/g or less, even more particularly 0.050 ml/g or less. More particularly, the pore volume may be measured by mercury intrusion porosimetry.

According to a further aspect of the invention, there is provided a solid obtainable by drying the dispersion described above. In particular, the solid may comprise a metal oxide. More particularly, the drying may be at 110° C. to constant mass.

In a further embodiment, this invention relates to a method of coating a substrate comprising the steps of:
(a) applying a dispersion as defined above to the substrate.
More particularly, the substrate may be as defined above. In particular, the step of applying may be by dip-coating, vacuum suction or pressurising. In some embodiments, the dispersion may be applied without including any further components. Alternatively, before step (a) the method may comprise the step of mixing the dispersion with one or more of alumina, platinum-group metals (PGMs) and promoters (i.e. that promote catalytic activity). Suitable promoters include transition metals, Group II metals (e.g. Sr and Ba), rare earth metals, and their salts. More particularly, after step (a), the method may additionally comprise the step of (b) allowing the substrate to dry. In particularly, the method may additionally comprise after step (a) and, if step (b) is used, after step (b), the step of (c) calcining the substrate. In some embodiments, calcination may be at 450-700° C., more particularly 475-650, even more particularly 500-600° C., more particularly about 550° C.

This invention will be further described by reference to the following Figures, which are not intended to limit the scope of the invention claimed, in which:

EXAMPLES

Examples 1-8 and 11: A mixed metal hydroxide (comprising the ratio of oxides as specified in Table 1 below) was prepared by precipitation from a mixture of zirconium oxychloride and metal nitrates solutions (each having a concentration 20 wt % as metal oxide—volume calculated from composition target shown in Table 1, except Fe where the solution concentration was 6.4%) in the presence of water and sulphuric acid (Zr:$SO_4$ mole ratio 0.42-0.70) using 10% sodium hydroxide, at a temperature less than 40° C. The resulting mixed metal hydroxide was then treated to reduce the particle size and remove residual impurities. This included the steps of: forming a slurry in deionised water, heating at >60° C., high energy stirring, reduction in pH to <9 using 30% nitric acid, filtration and washing with >2 litres/kg of deionised water. The final slurry concentration was then adjusted with de-ionised water. This resulted in dispersions having the concentration and particle size properties shown in Table 2. Examples 1-8 are zirconia-ceria based dispersions, and Example 11 is a (non-ceria) rare-earth-zirconia based dispersion.

Example 9: A solution of aluminium sulphate (Acorn Chemicals, 8 wt % $Al_2O_3$) was mixed with the required amounts of zirconium oxychloride and yttrium nitrate solutions (each having a concentration 20 wt % as metal oxide—volume calculated from composition target shown in Table 1). This solution was titrated (with good stirring) against a 27% sodium hydroxide solution at a temperature of 60-65° C., maintaining the pH~9 over a period of ~90 mins. The pH was then increased to ~10.5 and stirred for 45 mins before being filtered and washed with de-ionised water. The resulting mixed metal hydroxide was then treated to reduce the particle size and remove residual impurities. This included the steps of: forming a slurry in deionised water, heating at >60° C., high energy stirring, reduction in pH to <9 using 30% nitric acid, filtration and washing with >2 litres/kg of deionised water. The final slurry concentration was then adjusted with de-ionised water to give a dispersion having the concentration and particle size properties shown in Table 2.

Example 10: A solution of aluminium sulphate (Acorn Chemicals, 8 wt % $Al_2O_3$) was titrated (with good stirring) against a 27% sodium hydroxide solution at a temperature of 60-65° C., maintaining the pH~9 over a period of ~90 mins. The pH was then increased to ~10.5 and stirred for 45 mins before being filtered and washed with de-ionised water. The resulting wetcake was reslurried in deionised water and mixed with sodium silicate solution (in sufficient quantity to give the composition outlined in Table 2). The resulting mixed metal hydroxide was then treated to reduce the particle size and remove residual impurities. This included the steps of: heating at >60° C., high energy stirring, reduction in pH to <9 using 30% nitric acid, filtration and washing with >2 litres/kg of deionised water. The final slurry concentration was then adjusted with de-ionised water to give a dispersion having the concentration and particle size properties shown in Table 2.

Example 12: This sample was prepared by mixing Example 6b with Example 9 in the ratio 2:1.

Example 13: This sample was prepared by mixing Example 6b with an alumina sample in the ratio 2:1. The alumina part being prepared by taking Example 9, calcining (900° C./2 hr in air) and then subjecting to re-dispersion and de-agglomeration.

Example 14: This sample was prepared by taking Example 6b and mixing with commercial dispersible alumina HP14/L1 (i.e. 99 wt % $Al_2O_3$/1 wt % $La_2O_3$) in the ratio 2:1.

Figure 1:
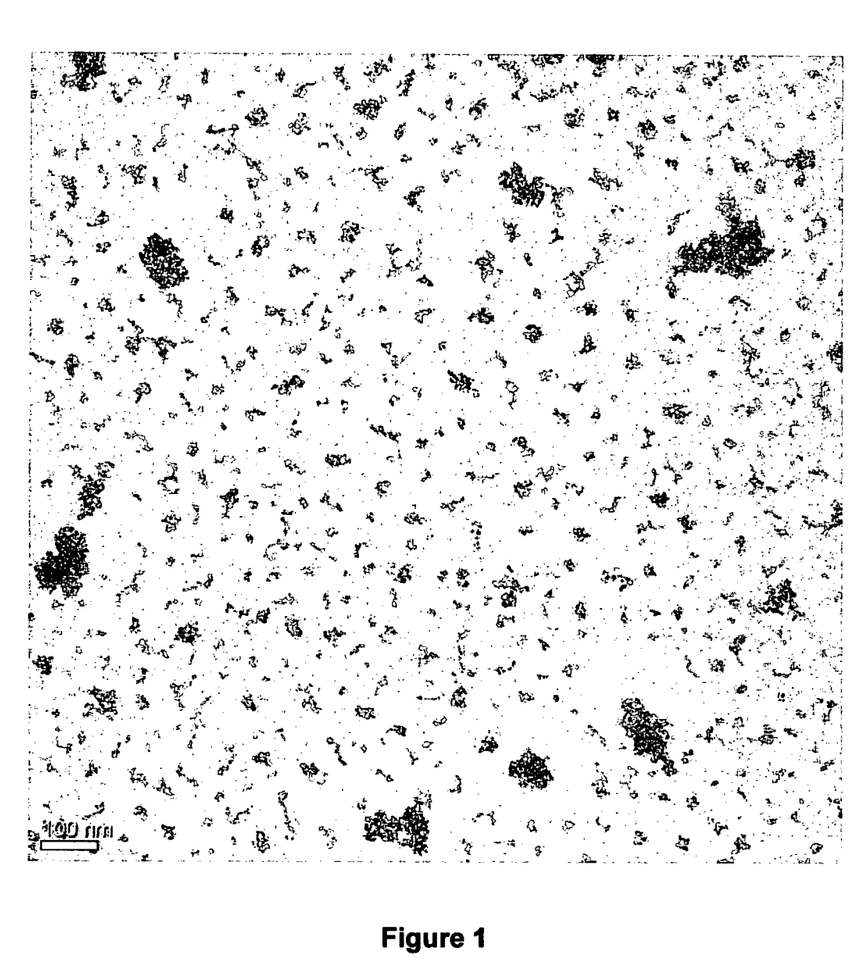
FIG. 1 shows a transmission electron microscopy (TEM) image of the particles of Example 6b.
Figure 3:
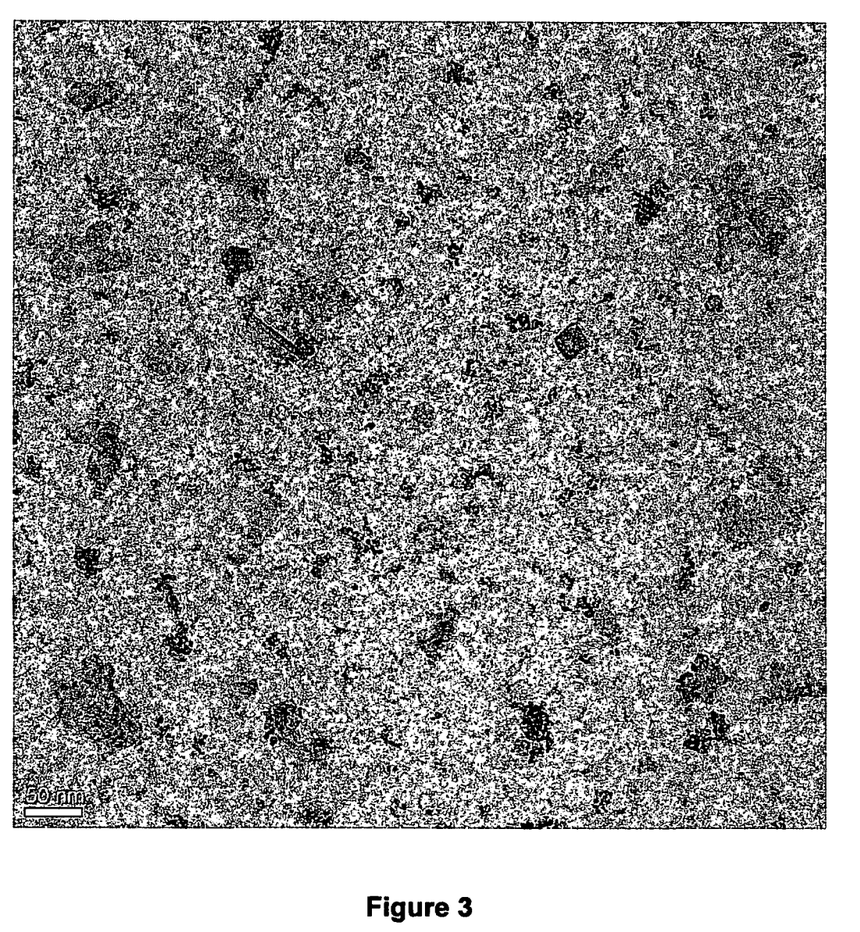
FIG. 3 shows a TEM image of the particles of Example 12.
Figure 4:
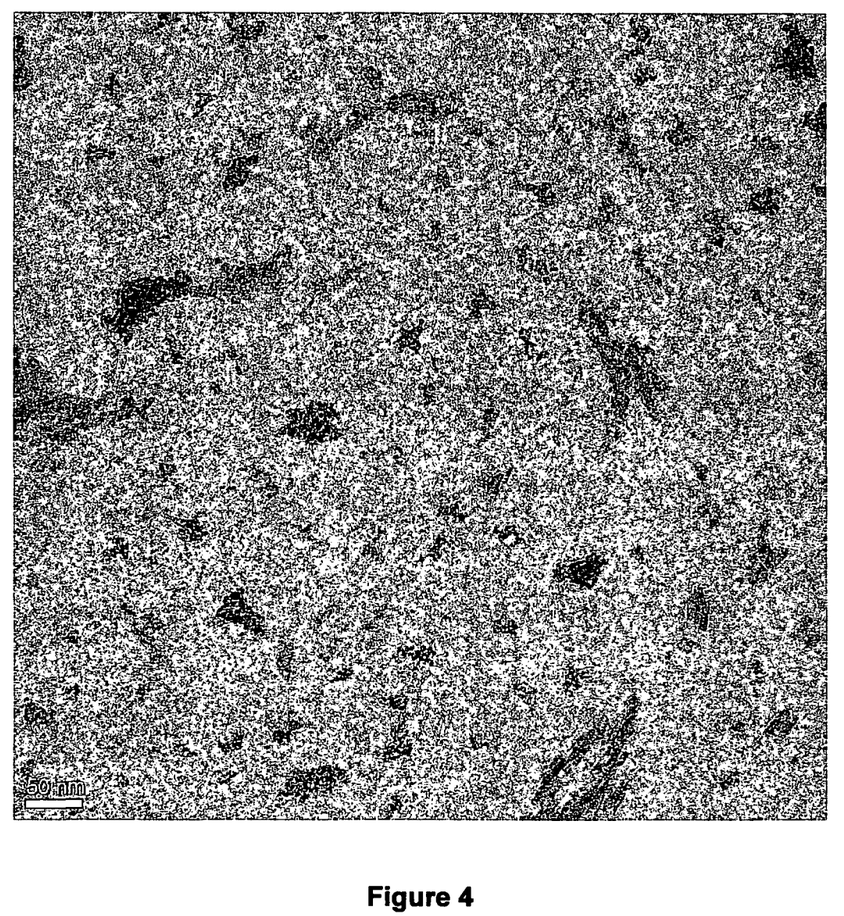
FIG. 4 shows a TEM image of the particles of Example 14.

The nm-scale of the particles of the present invention is demonstrated by TEM (FIG. 1). The compatibility of the zirconia-based particles and the alumina-based particles is evidenced from the TEM images in FIGS. 3 and 4. This is shown by the presence of discrete particles of both the CZ type (darker entities) and the Al type (lighter entities), i.e. no agglomeration effect is observed.

Comparative Example 1: A mixed metal hydroxide (comprising the ratio of oxides as specified in Table 1 below) was prepared by precipitation from a mixture of zirconium oxychloride and metal nitrates solutions (each having a concentration 20 wt % as metal oxide—volume calculated from composition target shown in Table 1) in the presence of water and sulphuric acid (Zr:$SO_4$ mole ratio 0.5) using 10% sodium hydroxide to pH>9, at a temperature less than 25° C. The resulting precipitate was then filtered and washed to remove residual impurities, then reslurried in deionised water to give final product. This resulted in dispersions having the concentration and particle size properties shown in Table 2.

Comparative Example 2: This was prepared according to the method described in patent EP144036B1 Example 3, except with the composition as outlined in Table 1. The final oxide product was de-agglomerated using a dry-milling technique to achieve the described particle size distribution.

Comparative Example 3: This sample was prepared as Comparative Example 2, except that a wet-milling technique was used to de-agglomerate the final oxide, to give the particle size distribution as outlined in Table 2.

Comparative Example 4: This sample was prepared as Comparative Example 2, except with the composition and final dry-milled particle size distribution as outlined in Table 2.

Comparative Example 5: This sample was prepared by mixing Comparative Example 2 with an alumina component prepared by taking Example 9, calcining (900° C./2 hr in air) and then wet-milling, in the ratio 2:1.

Comparative Example 6: This sample was prepared by mixing Comparative Example 2 with commercial grade SCFa-145/L4 (i.e. 96 wt % $Al_2O_3$/4 wt % $La_2O_3$) in a ratio of 2:1.

TABLE 1

| Example No. | $ZrO_2$ + $HfO_2$ (%) | $CeO_2$ (%) | $La_2O_3$ (%) | $Nd_2O_3$ (%) | $Pr_6O_{11}$ (%) | $Y_2O_3$ (%) | $Fe_2O_3$ (%) | $MnO_2$ (%) | $Al_2O_3$ (%) | $SiO_2$ (%) |
|---|---|---|---|---|---|---|---|---|---|---|
| 1 | 48.2 | 44.9 | — | 6.9 | — | — | — | — | — | — |
| 2 | 50.2 | 39.8 | 4 | 4 | — | 2 | — | — | — | — |
| 3 | 50.5 | 39.9 | 4.5 | 0.5 | 4.6 | — | — | — | — | — |
| 4 | 44.4 | 33.2 | — | — | 16.2 | — | 3.9 | 2.3 | — | — |
| 5 | 70.3 | 29.7 | — | — | — | — | — | — | — | — |
| 6a | 59.4 | 30.3 | 5.2 | — | — | 5.1 | — | — | — | — |
| 6b | 59.7 | 30.3 | 4.8 | — | — | 5.2 | — | — | — | — |
| 6c | 60.4 | 29.7 | 4.9 | — | — | 5 | — | — | — | — |
| 7 | 72.9 | 21.4 | 1.2 | 4.5 | — | — | — | — | — | — |
| 8 | 58.9 | 18.9 | — | 2.4 | 19.8 | — | — | — | — | — |
| 9 | 2.9 | — | — | — | — | 1.5 | — | — | 95.6 | — |
| 10 | — | — | — | — | — | — | — | — | 95.0 | 5.0 |
| 11 | 90.8 | — | 9.2 | — | — | — | — | — | — | — |
| 12 | 40.8 | 20.2 | 3.2 | — | — | 4.0 | — | — | 31.9 | — |
| 13 | 40.8 | 20.2 | 3.2 | — | — | 4.0 | — | — | 31.9 | — |
| 14 | 39.8 | 20.2 | 3.5 | — | — | 3.5 | — | — | 33.0 | — |
| 15 | 30.8 | 69.2 | | — | — | | — | — | — | — |
| Comp 1 | 60.5 | 29.8 | 5.0 | — | — | 4.8 | — | — | — | — |
| Comp 2 | 60.2 | 29.7 | 5.0 | — | — | 5.1 | — | — | — | — |
| Comp 3 | 60.3 | 29.8 | 4.9 | — | — | 5.0 | — | — | — | — |
| Comp 4 | 47.6 | 21.5 | — | 3.5 | 27.4 | — | — | — | — | — |
| Comp 5 | 41.1 | 19.8 | 3.3 | — | — | 3.9 | — | — | 31.9 | — |
| Comp 6 | 40.1 | 19.8 | 4.7 | — | — | 3.4 | — | — | 32.0 | — |

Oxide Concentration

A small portion of each dispersion was accurately weighed into a crucible, and this was slowly ramped from room temperature up to 1000° C., and then held at 1000° C. for 1 hr before being allowed to cool down to <300° C. Each sample was then placed in a desiccator, allowed to cool to room temperature and then weighed. The oxide concentration (or solids content) was obtained via the following equation:

% solids of dispersion=(calcined wt. of sample (g)/initial wt. of sample (g))×100

Particle Size (DLS)

Particle size measurements were made using a Malvern Zetasizer Nano ZS instrument, model ZEN3600, using a red laser of wavelength 633 nm. Each sample was first diluted to 0.5 wt. % using deionised water. 1 ml of the diluted sample was then placed in a DTS0012 disposable cuvette. The cuvette was loaded into the instrument and allowed to equilibrate to 25° C. A standard operating procedure (SOP) was created with the following parameters set: material refractive index 2.20, and material absorption value of 0.01 units. The dispersant refractive index (in this case, the continuous phase, i.e. water) was 1.33 and the dispersant viscosity was 0.8872 cP. The instrument was set to automatically adjust the laser position and attenuator settings to obtain the best measurement of particle size. A backscattering angle of 173° was used. The method of Dynamic Light Scattering (DLS) was used to calculate the particle size. A total of three measurements were taken with the cuvette being inverted between measurements. The three measurements were then averaged to give a final particle size result. The Z-average size or cumulant mean is a mean calculated from the intensity distribution and the calculation is based on assumptions that the particles are mono-modal, mono-dispersed and spherical. The polydispersity index (PDI) is a measure of the breadth of the particle size distribution and is calculated along with the Z-average size in the cumulant analysis of the intensity distribution. The PDI width is calculated by taking the square root of the PDI and multiplying this by the Z-average. The calculations for the Z-average size, polydispersity index and PDI width are defined in the ISO 22412:2017 "Particle size analysis—by Dynamic Light Scattering (DLS)".

Particle Size (Laser Diffraction)

Particle size measurements by volume were made using a Microtrac X100 instrument. Samples were initially dispersed/diluted in deionised water before being introduced into the instrument. The instrument uses a recirculated flow of deionised water containing a polyacrylate dispersant at a concentration of $2.5 \times 10^{-5}$ wt. %. An ultrasonic treatment (40 W for 60 seconds) was applied prior to measurement.

Viscosity Measurements

Viscosity measurements were collected using the DIN 53019 coaxial cylinder –30 mm diameter and loaded with 20 ml of sample. Each sample was tested in the temperature range 22° C.±5° C. Measurements were carried out using a Bohlin Visco 88 Viscometer. Ten measurements would be taken at 500 $s^{-1}$ shear rate with an average being calculated. This procedure was carried out on the sample as received (i.e. without any dilution).

TABLE 2

| Example No. | X100 $d_{10}$ (μm) | X100 $d_{50}$ (μm) | X100 $d_{90}$ (μm) | Zetasizer Z-Average (nm) | PDI | Oxide conc. (%) | pH | Density (g/cm³) | Viscosity (cPs) |
|---|---|---|---|---|---|---|---|---|---|
| 1 | 0.35 | 0.35 | 0.35 | 202.5 | 0.186 | 20.2 | 6.9 | 1.21 | 5.3 |
| 2 | 0.35 | 0.35 | 0.35 | 175.8 | 0.206 | 21.4 | 6.0 | 1.23 | 28.2 |
| 3 | 0.36 | 0.36 | 0.36 | 204.1 | 0.201 | 20.4 | 6.5 | 1.24 | 5.0 |
| 4 | 0.39 | 0.39 | 0.39 | 271.5 | 0.226 | 21.2 | 7.9 | | 11.9 |
| 5 | 0.34 | 0.34 | 0.34 | 180.8 | 0.206 | 16.9 | 4.6 | | 2.8 |
| 6a | 0.37 | 0.37 | 0.37 | 199.4 | 0.219 | 25.0 | 6.7 | | 14.0 |
| 6b | 0.36 | 0.47 | 0.73 | 185.0 | 0.195 | 21.2 | 6.1 | 1.22 | 5.2 |
| 6c | 0.36 | 0.47 | 0.72 | 239.2 | 0.254 | 37.3 | 6.0 | 1.48 | 82.0 |
| 7 | 0.36 | 0.47 | 0.77 | 173.2 | 0.230 | 20.1 | 4.7 | 1.21 | 3.8 |
| 8 | 0.32 | 0.40 | 0.52 | 170.1 | 0.183 | 19.5 | 7.2 | | |
| 9 | 0.33 | 0.43 | 0.59 | 116.0 | 0.225 | 18.2 | 5.8 | 1.17 | 16.5 |
| 10 | 0.41 | 0.53 | 0.76 | 199.6 | 0.220 | 20.1 | | | |
| 11 | 0.34 | 0.43 | 0.65 | 199.6 | 0.220 | 20.0 | 5.9 | 1.21 | |
| 12 | | | | 176.6 | 0.206 | 20.2 | | | |
| 13 | | | | 177.9 | 0.210 | 21.2 | | | |
| 14 | 0.36 | 0.47 | 0.89 | 207.8 | 0.233 | 28.0 | 5.2 | | |
| 15 | 0.40 | 0.50 | 0.70 | 205.1 | 0.304 | 19.5 | 3.3 | | |
| Comp 1 | 3.1 | 10.5 | 36.5 | N/A* | N/A* | 22 | 7.4 | | |
| Comp 2 | 0.8 | 1.3 | 2.3 | 618.8 | 0.635 | N/A | N/A | N/A | N/A |
| Comp 3 | 1.0 | 2.7 | 7.7 | N/A* | N/A* | N/A | N/A | N/A | N/A |
| Comp 4 | 1.1 | 3.8 | 8.5 | N/A* | N/A* | N/A | N/A | N/A | N/A |

*Sample particle size was too large/broad to be suitable for measurement on the instrument being used.

Solid Sample Characterisation

Dried samples were left overnight at 110° C. to obtain a constant mass. Surface area and total pore volume measurements were then made by liquid nitrogen adsorption at −196° C. in a Micromeritics TriStar 3020 analyser. Dried samples were degassed at 90° C. under vacuum for 30 minutes before analysis, whereas for aged samples degassed at 300° C. for 3 hrs under vacuum.

The LOI (loss on ignition) for the dried material was measured as outlined in the "Oxide concentration" testing above, except that a sample of dried material was accurately weighed into a crucible rather than the aqueous dispersion itself.

Surface area: Surface area was measured using BET multipoint determination. Total Pore Volume: Pore volume measurement was taken during desorption at p/p°=0.9814. Both surface area and total pore volume were measured for samples which had undergone a range of calcination conditions (time, temperature and under air or hydrothermal (HT) treatment). The surface area results are shown in Table 5, and the total pore volume data in Table 6.

TABLE 3

| Example No. | LOI (%) | SA (m²/g) | TPV (cm³/g) | CS (nm) |
|---|---|---|---|---|
| 1 | 5.5 | 182 | 0.24 | 3.7 |
| 2 | 8.1 | 209 | 0.20 | 3.9 |
| 3 | 5.9 | 183 | 0.25 | 3.4 |
| 4 | 8.5 | 178 | 0.32 | 2.6 |
| 5 | 6.6 | 166 | 0.18 | 5.0 |
| 6a | 6.8 | 188 | 0.19 | 4.0 |
| 6b | 6.9 | 217 | 0.20 | 4.0 |
| 6c | 7.2 | 128 | 0.17 | 4.5 |
| 7 | 7.9 | 181 | 0.16 | 5.0 |
| 8 | 7.1 | 216 | 0.18 | 3.9 |
| 9 | 19.5 | 135 | 0.35 | |
| 10 | | 253 | 0.40 | |
| 11 | 6.8 | 130 | 0.18 | 7.0 |
| 12 | 11.1 | 185 | 0.26 | 3.3 |
| 13 | 5.3 | 209 | 0.27 | 3.8 |
| 14 | 10.6 | 210 | 0.36 | 3.3 |
| 15 | 10.5 | 177 | 0.16 | 4.6 |
| Comp 1 | 19.5 | 329 | 0.51 | amorphous |

The powders after calcination at 550° C. for 2 hours (typical of in use/application conditions), were tested for impurity content. In the context of the invention, powders calcined in this way are referred to as "fresh". The results are shown in Table 4 below.

TABLE 4

| Example No. | SO₃ (%) | Na (ppm) | Cl (ppm) |
|---|---|---|---|
| 1 | 0.01 | 100 | 70 |
| 2 | 0.01 | 20 | 20 |
| 3 | 0.01 | 40 | 60 |
| 4 | 0.04 | 20 | 90 |
| 5 | <0.01 | 80 | 60 |
| 6a | 0.02 | 10 | 20 |
| 6b | 0.01 | 10 | 10 |
| 6c | <0.01 | <10 | 10 |
| 7 | <0.01 | 10 | 30 |
| 8 | <0.01 | 10 | 40 |
| 9 | 0.04 | 130 | 50 |
| 10 | 0.10 | 190 | 10 |
| 11 | <0.01 | 20 | 20 |
| 15 | <0.01 | 20 | 10 |
| Comp 1 | <0.01 | 20 | 10 |
| Comp 2 | <0.01 | 20 | 40 |
| Comp 3 | <0.01 | 40 | 60 |
| Comp 4 | <0.01 | 20 | 30 |

TABLE 5

| Example No. | Fresh (550° C./ 2 hr) (m²/g) | 950° C./ 2 hr (Air) (m²/g) | 1000° C./ 4 hr (Air) (m²/g) | 1100° C./ 6 hr (Air) (m²/g) | 1100° C./ 12 hr (HT) (m²/g) | 1150° C./ 5 hr (Air) (m²/g) |
|---|---|---|---|---|---|---|
| 1 | 108 | 41 | 26 | 8.8 | 10 | |
| 2 | 120 | 50 | 37 | | 10 | 0.8 |
| 3 | 99 | 47 | 34 | 13 | 12 | |
| 4 | 109 | | | | | |
| 5 | 87 | 27 | 16 | 1.2 | | |
| 6a | 123 | 53 | | | 8.6 | |
| 6b | 115 | 48 | 33 | | 7.4 | 0.6 |
| 6c | 72 | | 27 | | 11 | 5.2 |
| 7 | 91 | 44 | 28 | | 3.9 | |
| 8 | 114 | 48 | 35 | 5.6 | | |
| 9 | 164 | 103 | 86 | | 57 | 50 |
| 10 | 292 | | 188 | | 106 | |
| 11 | 87 | | | | | |
| 12 | 144 | | 54 | | 25 | 28 |
| 13 | 152 | | 54 | | 25 | 15 |
| 14 | 140 | | 59 | | 33 | 26 |
| 15 | 92 | 24 | 14 | | | |
| Comp 2 | 107 | 56 | 43 | | 17 | 6.5 |
| Comp 3 | 82 | 64 | 54 | | 18 | 8.6 |
| Comp 4 | 84 | 54 | 40 | | 14 | |
| Comp 5 | 113 | | 62 | | 25 | 20 |
| Comp 6 | 111 | | 61 | | 30 | 23 |

TABLE 6

| Example No. | Fresh (550° C./ 2 hr) (cm³/g) | 950° C./ 2 hr (Air) (cm³/g) | 1000° C./ 4 hr (Air) (cm³/g) | 1100° C./ 6 hr (Air) (cm³/g) | 1100° C./ 12 hr (HT) (cm³/g) | 1150° C./ 5 hr (Air) (cm³/g) |
|---|---|---|---|---|---|---|
| 1 | 0.23 | 0.16 | 0.14 | 0.08 | 0.10 | |
| 2 | 0.18 | 0.14 | 0.12 | | 0.07 | 0.004 |
| 3 | 0.22 | 0.18 | 0.16 | 0.11 | 0.10 | |
| 4 | 0.27 | | | | | |
| 5 | 0.16 | 0.09 | 0.07 | 0.007 | | |
| 6a | 0.20 | 0.15 | | | 0.05 | |
| 6b | 0.17 | 0.13 | 0.11 | | 0.04 | 0.002 |
| 6c | 0.15 | | 0.12 | | 0.07 | 0.03 |
| 7 | 0.15 | 0.11 | 0.09 | | 0.02 | |
| 8 | 0.16 | 0.13 | 0.12 | 0.04 | | |
| 9 | 0.50 | 0.47 | 0.44 | | 0.39 | 0.31 |
| 10 | 0.58 | | 0.57 | | 0.46 | |
| 11 | 0.17 | | | | | |
| 12 | 0.29 | | 0.23 | | 0.17 | 0.16 |
| 13 | 0.28 | | 0.20 | | 0.14 | 0.09 |
| 14 | 0.38 | | 0.31 | | 0.22 | 0.17 |
| 15 | 0.15 | 0.11 | 0.09 | | | |
| Comp 2 | 0.3 | 0.24 | 0.2 | | 0.1 | 0.03 |
| Comp 3 | 0.34 | 0.3 | 0.26 | | 0.12 | 0.05 |
| Comp 4 | 0.24 | 0.21 | 0.19 | | 0.11 | |
| Comp 5 | 0.42 | | 0.30 | | 0.14 | 0.10 |
| Comp 6 | 0.40 | | 0.32 | | 0.16 | 0.12 |

Figure 2:
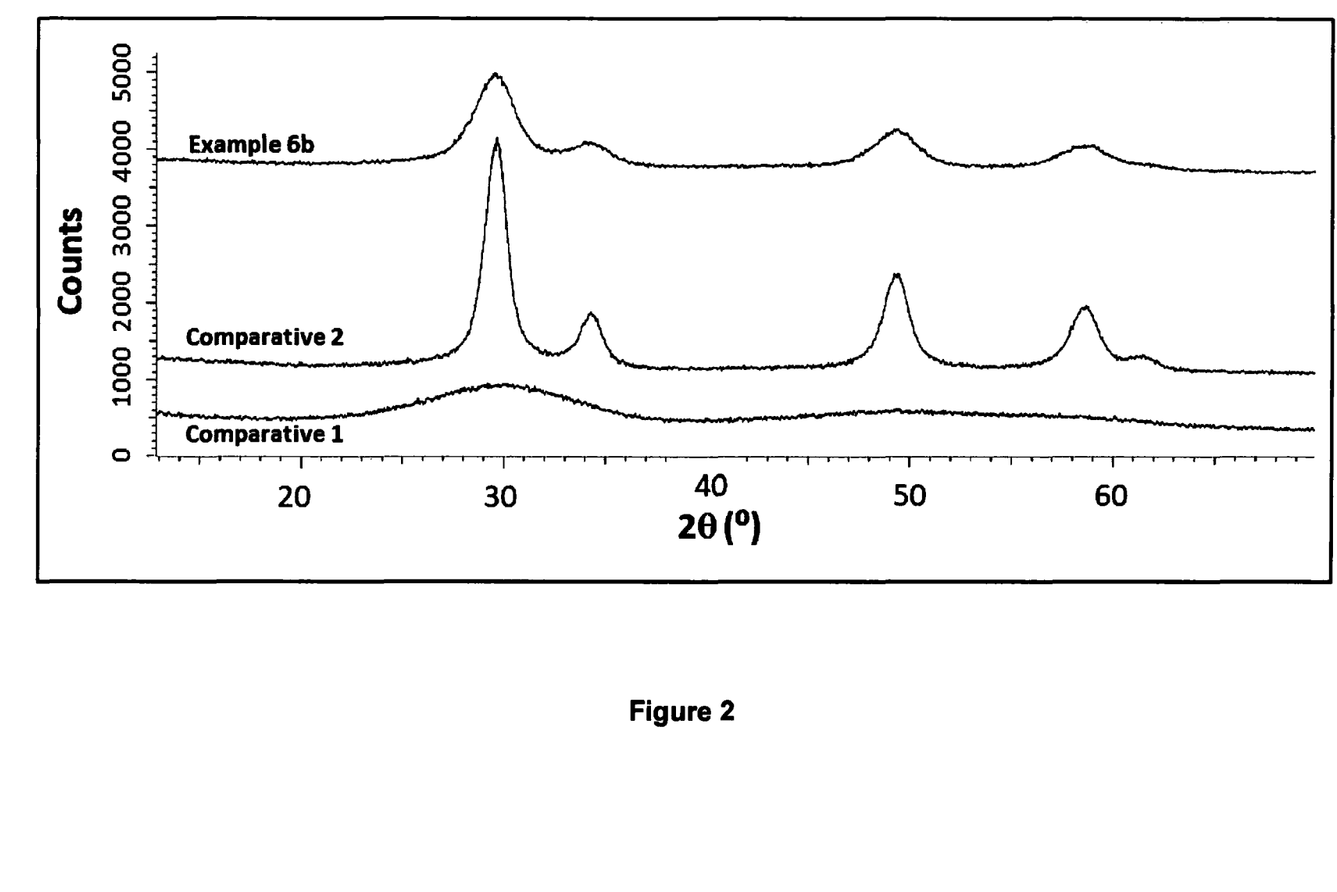
FIG. 2 shows XRD traces for the particles of Example 6b, and Comparative Examples 1 and 2 dried at 110° C.

Crystallite size determination was also performed. The powder XRD crystallographic phase analysis of the materials was carried out on a Bruker D8 Advance X-ray diffusion system (Diffrac. EVA software, Bragg-Brentano geometry, LYNXEYE detector, Cu radiation ($\lambda$=1.5418 Å) in the 2θ range from 10° to 70°, 0.015° per step, time per step 0.2 s, 0.02 mm Ni filter, applied power 40 mV/40 mA). The crystallite size determination was done via the Scherrer method, K=0.9, using the peak at ~29.5° 2θ, generally accepted as (111) miller index, again under a range of calcination conditions, and the results are shown in Table 7 below. Exemplary XRD traces for Example 6b and Comparative Examples 1 and 2 are shown in FIG. 2.

TABLE 7

| | Fresh (550° C./ 2 hr) (nm) | 950° C./ 2 hr (Air) (nm) | 1000° C./ 4 hr (Air) (nm) | 1100° C./ 6 hr (Air) (nm) | 1100° C./ 12 hr (HT) (nm) | 1150° C./ 5 hr (Air) (nm) |
|---|---|---|---|---|---|---|
| 1 | 5.5 | 10 | 13 | 20 | | |
| 2 | 5.0 | | 11 | | 24 | 41 |
| 3 | 5.2 | 8.2 | 11 | 22 | 20 | |
| 4 | 4.7 | | | | | |

TABLE 7-continued

| | Fresh (550° C./ 2 hr) (nm) | 950° C./ 2 hr (Air) (nm) | 1000° C./ 4 hr (Air) (nm) | 1100° C./ 6 hr (Air) (nm) | 1100° C./ 12 hr (HT) (nm) | 1150° C./ 5 hr (Air) (nm) |
|---|---|---|---|---|---|---|
| 5 | 6.7 | 15 | 21 | 31 | | |
| 6a | 5.2 | 8.8 | | | 29 | |
| 6b | 5.5 | 8.7 | 12 | | 28 | 41 |
| 6c | 6.2 | | 13 | | 25 | 33 |
| 7 | 6.3 | 11 | 14 | | 29 | |
| 8 | 5.3 | 9.3 | 13 | 44 | | |
| 9 | — | — | — | — | — | — |
| 10 | — | — | — | — | — | — |
| 11 | 8.2 | | | | | |
| 12 | 5.0 | | 13 | | 25 | 24 |
| 13 | 4.9 | | 13 | | 24 | 23 |
| 14 | 5.0 | | 13 | | 25 | 28 |
| 15 | 6.0 | 8.5 | 9.8 | | | |
| Comp 2 | 6 | 9.5 | 11 | | 22 | 32 |
| Comp 3 | 7.3 | 8.9 | 11 | | 23 | 30 |
| Comp 4 | 6 | 9.1 | 12 | | 33 | |
| Comp 5 | 6.6 | | 13 | | 31 | 40 |
| Comp 6 | 6.7 | | 13 | | 30 | 39 |

Mercury Intrusion Porosimetry of Coated Substrates

The samples outlined in Table 8 were dip coated onto a high porosity cordierite substrate (bare filter substrates obtained from EHC Teknik ab, 80×100 mm, 300 cpsi; from which 20 mm diameter cores were cut, ensuring that each had the same number of active channels and that these channels were all intact). Samples were coated without addition of any other components, with the exception of Comparative Example 2 which had ~5% zirconium oxynitrate added as a binder (in addition to the water required to make a slurry). Following coating the samples were calcined at 550° C.

Mercury porosimetry was carried out using a Micromeritics Autopore V instrument model 9620. Samples were degassed immediately prior to analysis at 100° C. under dynamic vacuum for 120 minutes. Single pieces of solid sample were cut to dimensions of approximately 5 mm×5 mm×20 mm so that approximately 0.4 g of coated sample or 0.35 g of uncoated sample was analysed. Low pressure analysis was conducted from filling pressure (0.3 psia) to 40 psia with 10 second equilibration times. Intrusion volume was measured at <30 applied pressures. High pressure analysis was conducted from 40 psia to 60,000 psia with 10 second equilibration times and a maximum intrusion volume limit of 0.01 mL/g in pressure regions of anticipated mercury intrusion. Intrusion volume was measured at <60 applied pressures. The advancing mercury contact angle applied was 140° and the mercury surface tension was 480 dynes/cm.

TABLE 8

| Example No. | Loading (g/L) | Total Pore Vol. (ml/g) | Pore Vol. (100-5 µm) (ml/g) | Pore Vol. (2-0.1 µm) (ml/g) |
|---|---|---|---|---|
| Blank | 0 | 0.649 | 0.594 | 0.0086 |
| 3 | 116 | 0.430 | 0.276 | 0.042 |
| 6b | 116 | 0.414 | 0.289 | 0.037 |
| 12 | 116 | 0.422 | 0.299 | 0.025 |
| Comp 2 | 110 | 0.478 | 0.306 | 0.087 |
| Comp 3 | 122 | 0.471 | 0.263 | 0.070 |

Figure 5:
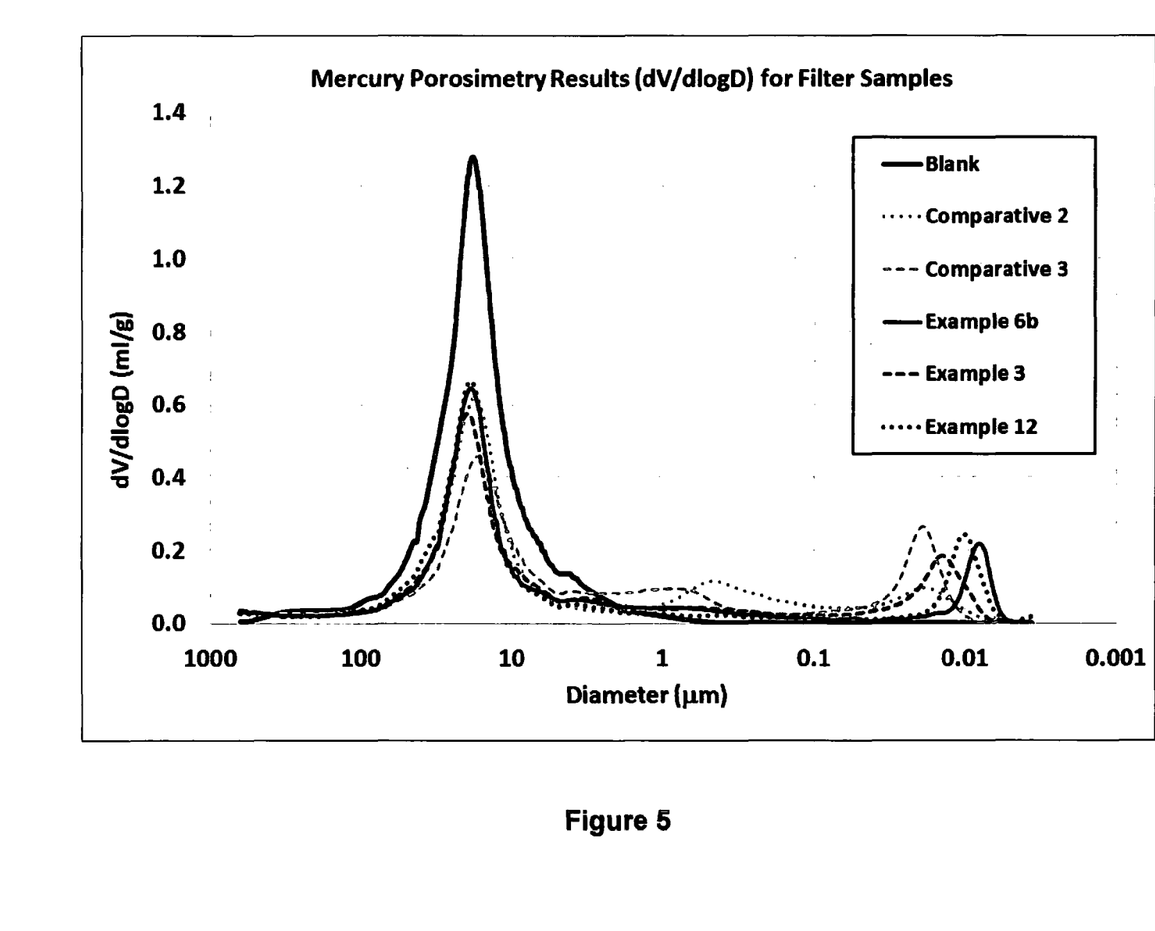
FIG. 5 shows mercury porosimetry traces for cordierite filter samples coated using the dispersions of Example 3, Example 6b, Example 12, Comparative Example 3 and Comparative Example 12, as well as a blank (i.e. uncoated) filter.

The mercury porosimetry traces of FIG. 5 clearly show the formation of porosity in the ~2-0.1 µm range for the Comparative Examples, which would tend to restrict the flow of gas through the article. Porosity in this range is much lower in the Examples of the invention.

Backpressure Testing of Coated Substrates

Silicon carbide filter samples (obtained as pre-made core-size pieces with outer skin, from EHC Teknik ab, 25×76 mm, 200 cps) were coated with the samples outlined in Table 9, using the same coating method as described above. Example 8 was coated with no additional components, but Comparative Example 4 had ~5% zirconium oxynitrate added as a binder (in addition to the water required to create a slurry).

Filter samples were fixed into a glass tube using silicone sealant, and then nitrogen was passed at various flow rates with the pressure being recorded at both the inlet and outlet sides.

TABLE 9

| Example No. | Washcoat Loading (g/L) | ΔP at 126000 h$^{-1}$ (kPa) |
|---|---|---|
| Blank | 0 | 6 |
| 8 | 79 | 8 |
| Comp 4 | 79 | 9 |

ΔP in the above table is the differential pressure across the filter (i.e. inlet pressure–outlet pressure). Thus, even for a blank (i.e. uncoated) filter, this is 6 kPa. This increases to 8 kPa for the inventive sample. However, ΔP is a further 50% higher relative to the blank filter, i.e. 9 kPa, for the comparative example.

Transmission Electron Microscopy (TEM)

TEM analysis was carried out using a sample preparation involving taking 1 ml of dispersion and diluting to 100 ml in pure water. This sample was then subject to ultrasonic treatment (40 W/5 mins). Following that, 1 ml of this sample was diluted to 10 ml in methanol before further ultrasonic treatment (40 W/5 min). Finally, a single drop of this sample was placed on to a mesh with collodion membrane via micropipette, before being allowed to dry naturally.

Redox Analysis

Material made according to the Examples was analysed by H$_2$ Temperature programmed reduction (H$_2$-TPR). H$_2$-TPR was carried out on samples after calcination at 1000° C./4 hr in air. The sample size was 80-100 mg. The 1$^{st}$ TPR was carried out from 270° C.-900° C., 10° C./min ramp rate using 5% $H_2$/Ar. Each sample was then re-oxidised in 20% $O_2$/He at 500° C. for 30 mins. Each sample was then cooled to 290° C. in 20% $O_2$/He, before being cooled further to 240° C. under flowing Ar. The $2^{nd}$ TPR was carried out from 240° C.-850° C., 10° C./min ramp rate using 5% $H_2$/Ar. The reaction ($H_2$-uptake) was monitored by a Thermal Conductivity Detector (TCD). Results were normalized/calibrated against a CuO reference. The results are shown in Table 10 below.

TABLE 10

| | $1^{st}$ $H_2$-TPR | | | $2^{nd}$ $H_2$-TPR | | |
|---|---|---|---|---|---|---|
| Example No. | $T_{max}$ (° C.) | $H_2$-Uptake (μmol/g) | Ce eff. (%) | $T_{max}$ (° C.) | $H_2$-Uptake (μmol/g) | Ce eff. (%) |
| 1 | 590 | 876 | 67 | 572 | 974 | 74 |
| 2 | 585 | 830 | 71 | 552 | 841 | 72 |
| 3 | 594 | 802 | 69 | 565 | 903 | 77 |
| 5 | 613 | 794 | 91 | 571 | 784 | 90 |
| 6b | 593 | 674 | 77 | 562 | 740 | 84 |
| 6c | 595 | 677 | 77 | 568 | 707 | 81 |
| 7 | 616 | 552 | 95 | 580 | 553 | 91 |
| 8 | 589 | 511 | 88 | 558 | 552 | 98 |
| 12 | 601 | 456 | 78 | 575 | 520 | 89 |
| 13 | 609 | 484 | 83 | 585 | 564 | 97 |
| 14 | 606 | 479 | 82 | 579 | 468 | 80 |
| Comp 2 | 589 | 715 | 82 | 554 | 754 | 86 |
| Comp 3 | 579 | 643 | 74 | 543 | 759 | 87 |
| Comp 4 | 577 | 445 | 76 | 556 | 546 | 94 |
| Comp 5 | 607 | 472 | 81 | 573 | 532 | 91 |
| Comp 6 | 601 | 447 | 77 | 572 | 515 | 88 |

Material made according to the Examples was analysed by $O_2$-Pulse Oxygen Storage Capacity (OSC). $O_2$-pulse OSC was carried out on samples after ageing at 1000° C./4 hr in air, and after the two consecutive $H_2$-TPR experiments described above (plus an initial re-oxidation at 100° C.). Each sample (80-100 mg) was pre-reduced in 5% $H_2$/Ar at 600° C. for 30 mins. Each sample was then cooled to $T_{reaction}$ (either 100° C. or 200° C., as referred to in Table 15) under flowing Ar. Pulses of 20% $O_2$/He (527 μl) were then periodically injected into a He carrier stream flowing at 30 ml/min. The reaction ($O_2$-uptake) was monitored by TCD. The results are shown in Table 11 below, including Ce-normalised vales (i.e. OSC per gram $CeO_2$)

TABLE 11

| Example No. | OSC (100° C.) (μmol $O_2$/g) | OSC (100° C.) (μmol$O_2$/g$CeO_2$) | OSC (200° C.) (μmol $O_2$/g) | OSC (200° C.) (μmol$O_2$/g$CeO_2$) |
|---|---|---|---|---|
| 1 | 282 | 626 | 267 | 593 |
| 2 | 249 | 622 | 238 | 595 |
| 3 | 286 | 716 | 302 | 756 |
| 5 | 79 | 262 | 211 | 703 |
| 6b | 265 | 883 | 263 | 876 |
| 6c | 268 | 894 | 285 | 951 |
| 7 | 196 | 978 | 196 | 981 |
| 8 | 130 | 650 | 126 | 630 |
| 12 | 132 | 662 | 131 | 656 |
| 13 | 123 | 613 | 136 | 679 |
| 14 | 120 | 598 | 130 | 649 |
| Comp 2 | 267 | 890 | 258 | 861 |
| Comp 3 | 202 | 673 | 195 | 651 |
| Comp 4 | 91 | 455 | 84 | 420 |
| Comp 5 | 87 | 433 | 92 | 462 |
| Comp 6 | 121 | 603 | 119 | 595 |

Material made according to the Examples was then loaded with Pd in an amount of 1 wt % (impregnation using palladium nitrate) and then analysed by $H_2$-Pulse OSC. $H_2$-pulse OSC was carried out on samples after hydrothermal ageing at 1100° C./12 hr (10% $H_2O$ in flowing air). Testing was carried out as part of a multi-sequence analysis, and was preceded by the $H_2$-TPR test described above. Each sample was first pre-oxidised (500° C./30 mins in 20% $O_2$/He), before being cooled to 250° C. in this 20% $O_2$/He gas mix. Each sample was then further cooled further to $T_{reaction}$ (either 100° C. or 150° C.) under flowing Ar. 527 μl pulses of 100% $H_2$ were then injected periodically into an Ar carrier stream at 50 ml/min. The reaction ($H_2$-uptake) was monitored by TCD. The results are shown in Tables 12 (100° C.) and 13 (150° C.) below.

TABLE 12

| Example No. | $1^{st}$-pulse OSC (μmol$H_2$/g) | $1^{st}$-pulse OSC (μmol$H_2$/g$CeO_2$) | OSCC (μmol$H_2$/g) | OSCC (μmol$H_2$/g$CeO_2$) |
|---|---|---|---|---|
| 6b | 51 | 170 | 92 | 308 |
| 12 | 70 | 348 | 85 | 424 |
| 13 | 75 | 373 | 96 | 481 |
| 14 | 72 | 361 | 84 | 420 |
| Comp 2 | 100 | 335 | 166 | 553 |
| Comp 3 | 98 | 325 | 158 | 528 |
| Comp 5 | 63 | 316 | 68 | 339 |
| Comp 6 | 59 | 297 | 61 | 307 |

TABLE 13

| Example No. | $1^{st}$-pulse OSC (μmol$H_2$/g) | $1^{st}$-pulse OSC (μmol$H_2$/g$CeO_2$) | OSCC (μmol$H_2$/g) | OSCC (μmol$H_2$/g$CeO_2$) |
|---|---|---|---|---|
| 6b | 127 | 422 | 208 | 692 |
| 12 | 132 | 661 | 170 | 849 |
| 13 | 145 | 726 | 187 | 934 |
| 14 | 138 | 692 | 163 | 816 |
| Comp 2 | 163 | 542 | 249 | 831 |
| Comp 3 | 164 | 548 | 232 | 773 |
| Comp 5 | 118 | 590 | 166 | 828 |
| Comp 6 | 107 | 533 | 142 | 708 |

Material made according to the Examples was then loaded with Rh in an amount of 0.1 wt % (impregnation using rhodium nitrate) and then analysed by $H_2$-Pulse OSC. $H_2$-pulse OSC was carried out on samples after hydrothermal ageing at 1100° C./12 hr (10% $H_2O$ in flowing air). Testing was carried out as described for 1 wt % Pd-loaded samples, except for the reaction temperatures (either 105° C. or 150° C.), and the $H_2$ concentration in the pulse was 50% for the 0.1 wt % Rh-loaded samples. The results are shown in Tables 14 (105° C.) and 15 (150° C.) below.

TABLE 14

| Example No. | $1^{st}$-pulse OSC (μmol$H_2$/g) | $1^{st}$-pulse OSC (μmol$H_2$/g$CeO_2$) | OSCC (μmol$H_2$/g) | OSCC (μmol$H_2$/g$CeO_2$) |
|---|---|---|---|---|
| 6b | 22 | 72 | 85 | 283 |
| 12 | 15 | 73 | 58 | 288 |
| 13 | 11 | 57 | 55 | 276 |
| 14 | 9 | 45 | 49 | 247 |
| Comp 2 | 16 | 53 | 74 | 247 |
| Comp 3 | 56 | 187 | 143 | 477 |
| Comp 6 | 0 | 0 | 0 | 0 |

TABLE 15

| Example No. | 1st-pulse OSC (μmolH₂/g) | 1st-pulse OSC (μmolH₂/gCeO₂) | OSCC (μmolH₂/g) | OSCC (μmolH₂/gCeO₂) |
|---|---|---|---|---|
| 6b | 70 | 232 | 168 | 559 |
| 12 | 50 | 249 | 119 | 595 |
| 13 | 51 | 254 | 117 | 583 |
| 14 | 48 | 239 | 108 | 541 |
| Comp 2 | 83 | 275 | 205 | 683 |
| Comp 3 | 81 | 269 | 220 | 735 |
| Comp 6 | 16 | 80 | 59 | 296 |

The invention claimed is:

1. An aqueous dispersion of particles, the dispersion having a particle content of 10-70 wt %, and the particles comprising, on an oxide basis:
   (a) 10-98 wt % in total of $ZrO_2$+$HfO_2$, and
   (b) 2-90 wt % in total of $Al_2O_3$, $CeO_2$, $La_2O_3$, $Nd_2O_3$, $Pr_6O_{11}$, $Y_2O_3$, or a transition metal oxide,
   wherein the dispersion has a Z-average particle size of 100-350 nm and the particles have a crystallite size of 1-9 nm,
   wherein the dispersion has a pH of 3-9.

2. The aqueous dispersion of particles as claimed in claim 1, wherein the particles comprise, on an oxide basis:
   (a) 10-98 wt % in total of $ZrO_2$+$HfO_2$,
   (b) 2-90 wt % $CeO_2$,
   (c) 0-30 wt % in total of $La_2O_3$, $Nd_2O_3$, $Pr_6O_{11}$, $Y_2O_3$, or a transition metal oxide, and
   (d) 0-88 wt % $Al_2O_3$.

3. The aqueous dispersion of particles as claimed in claim 1, wherein the particles comprise, on an oxide basis, 25-80 wt % in total of $ZrO_2$+$HfO_2$.

4. The aqueous dispersion of particles as claimed in claim 1, wherein the particles comprise, on an oxide basis, 10-80 wt % $CeO_2$.

5. The aqueous dispersion of particles as claimed in claim 1, wherein the particles comprise, on an oxide basis, 0-25 wt % in total of $La_2O_3$, $Nd_2O_3$, $Pr_6O_{11}$, $Y_2O_3$, and transition metal oxides.

6. The aqueous dispersion of particles as claimed in claim 1, wherein the dispersion has a particle content of 10-45 wt %.

7. The aqueous dispersion of particles as claimed in claim 1, wherein the dispersion additionally comprises particles comprising, on an oxide basis, at least 50 wt % $Al_2O_3$.

8. The aqueous dispersion of particles as claimed in claim 1, wherein the particles have a crystallite size of 2-8 nm.

9. The aqueous dispersion of particles as claimed in claim 1, wherein the particles have, after calcination at 1000° C. for 4 hours, a $CeO_2$ reduction efficiency of at least 50%.

10. The aqueous dispersion of particles as claimed in claim 1, wherein the particles have, after calcination at 1000° C. for 4 hours, an OSC of at least 400 $\mu molO_2/gCeO_2$.

11. A substrate coated with the aqueous dispersion of particles as claimed in claim 1.

12. A substrate coated with the aqueous dispersion of particles as claimed in claim 11, wherein the substrate is a filter having a pore volume in the range 2-0.1 μm of 0.065 ml/g or less.

13. The aqueous dispersion of particles as claimed in claim 1, wherein the dispersion has a dynamic viscosity of 1-1000 cPs.

14. An aqueous dispersion of particles, the dispersion having a particle content of 10-70 wt %, and the particles comprising, on an oxide basis:
   (a) 10-98 wt % in total of $ZrO_2$+$HfO_2$, and
   (b) 2-90 wt % in total of $Al_2O_3$, $CeO_2$, $La_2O_3$, $Nd_2O_3$, $Pr_6O_{11}$, $Y_2O_3$, or a transition metal oxide,
   wherein the dispersion has a Z-average particle size of 100-350 nm and the particles have a crystallite size of 1-9 nm,
   wherein the dispersion has a polydispersity index of 0.15-0.35.

15. The aqueous dispersion of particles as claimed in claim 1, wherein the dispersion has a Z-average particle size of 100-300 nm.

16. The aqueous dispersion of particles as claimed in claim 1, wherein the particles have a loss on ignition of 1-20 wt %.

17. A substrate coated with the aqueous dispersion of particles as claimed in claim 16.

18. The aqueous dispersion of particles as claimed in claim 14, wherein the particles have a loss on ignition of 1-20 wt %.

19. An aqueous dispersion of particles, the dispersion having a particle content of 10-70 wt %, and the particles comprising, on an oxide basis:
   (a) 10-98 wt % in total of $ZrO_2$+$HfO_2$, and
   (b) 2-90 wt % in total of $Al_2O_3$, $CeO_2$, $La_2O_3$, $Nd_2O_3$, $Pr_6O_{11}$, $Y_2O_3$, or a transition metal oxide,
   wherein the dispersion has a Z-average particle size of 100-350 nm and the particles have a crystallite size of 1-9 nm,
   wherein the dispersion has a dynamic viscosity of 1-1000 cPs.

20. The aqueous dispersion of particles as claimed in claim 19, wherein the particles have a loss on ignition of 1-20 wt %.

* * * * *